United States Patent
Ganapathiappan

(10) Patent No.: US 8,252,854 B2
(45) Date of Patent: Aug. 28, 2012

(54) SULFONATED OR PHOSPHONATED LATEX POLYMERS FOR INK-JET PRINTING

(75) Inventor: Slvapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1047 days.

(21) Appl. No.: 11/825,214

(22) Filed: Jul. 3, 2007

(65) Prior Publication Data

US 2009/0007816 A1    Jan. 8, 2009

(51) Int. Cl.
*C09D 11/00* (2006.01)
*C08K 9/00* (2006.01)
*C08K 5/42* (2006.01)
*C08K 5/41* (2006.01)
*C08C 19/02* (2006.01)

(52) U.S. Cl. ........ 523/160; 523/200; 524/147; 524/155; 524/157

(58) Field of Classification Search .......... 523/160, 523/161, 200; 430/114, 115, 116; 524/147, 524/157, 155
See application file for complete search history.

(56) References Cited

U.S. PATENT DOCUMENTS

| | | | |
|---|---|---|---|
| 4,917,985 A * | 4/1990 | El-Sayed et al. | 430/114 |
| 4,985,519 A | 1/1991 | Koishi et al. | |
| 5,573,882 A * | 11/1996 | Larson et al. | 430/115 |
| 5,880,234 A | 3/1999 | Maeda et al. | |
| 5,990,202 A | 11/1999 | Nguyen et al. | |
| 6,057,384 A | 5/2000 | Nguyen et al. | |
| 6,103,788 A | 8/2000 | Harui et al. | |
| 6,417,249 B1 | 7/2002 | Nguyen et al. | |
| 6,506,245 B1 | 1/2003 | Kinney et al. | |
| 6,713,584 B1 | 3/2004 | Chisholm et al. | |
| 2004/0157958 A1 * | 8/2004 | Vincent et al. | 523/160 |
| 2006/0068131 A1 | 3/2006 | Hanrahan | |

FOREIGN PATENT DOCUMENTS

| | | |
|---|---|---|
| FR | 2 676 451 | 11/1992 |
| KR | 10-2006-0087881 | 8/2006 |
| WO | WO 99/46310 | 9/1999 |
| WO | WO 01/85808 | 11/2001 |
| WO | WO 2003/014237 | 2/2003 |
| WO | WO 2003/044103 | 5/2003 |
| WO | WO 2006/030976 | 3/2006 |
| WO | WO 2006/030978 | 3/2006 |
| WO | WO 2006/064193 | 6/2006 |
| WO | WO 2007/049806 | 3/2007 |

OTHER PUBLICATIONS

Merriam-webwter's collegiate Dictionary, 10$^{th}$ Edition, Merriam-Webster, Inc. Springfield, MA (1997), p. 589 (3 pages total).*

* cited by examiner

*Primary Examiner* — Basia Ridley
*Assistant Examiner* — Alexander Kollias

(57) ABSTRACT

The present invention is drawn to a latex particulate having a plurality of polymerized monomers and a dispersing agent incorporated therein. The dispersing agent can have the structure $X-CH_2(R)-SO_3M$, $X-CH_2(R)-PO_3M_2$, or mixtures thereof, wherein X is SH, Cl or Br; R is independently $C_1$ to $C_{19}$ alkyl; and M is independently Li, Na, or K. The dispersing agent can comprise from about 0.1 wt % to about 20 wt % of the latex particulate.

20 Claims, No Drawings

SULFONATED OR PHOSPHONATED LATEX POLYMERS FOR INK-JET PRINTING

BACKGROUND OF THE INVENTION

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Though there has been great improvement in ink-jet printing technology, there is still improvement that can be made in many areas.

With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks typically have low viscosity to accommodate high frequency jetting and firing chamber refill processes common to ink-jet pens.

In addition to general image fade that occurs in many ink-jet ink systems, ink-jet prints have also been known for poor durability when exposed to water or high humidity. This results from the use of water-soluble and water dispersible colorants within the water-based ink. There has been great improvement in the area of water durability of ink-jet inks through incorporation of certain ink-jet compatible latexes. The latex can comprise small micron or submicron hydrophobic polymeric particles of high molecular weight that are dispersed in an aqueous fluid, which fluid ultimately becomes at least part of a liquid vehicle of an ink-jet ink. When printed as part of an ink-jet ink, latex particulates of the ink can form a hydrophobic print film on a media surface, entrapping and protecting the colorant within the film. However, such latex compositions can create problems with respect to pen reliability, as well as with respect to settling of the latex over time.

Conventional latex particles are normally designed to flocculate so that latex precipitate may be easily shaken or stirred back into dispersion without agglomeration. Such flocculation behavior is well known with latex paints. Unfortunately, these conventional teachings do not address the unique needs of ink-jet printing applications. For example, it may be desired that a latex for use in an ink-jet printing application have good dispersion stability, and thus, would tend to avoid flocculation while within the ink-jet architecture. The microchannel ink feeds in ink-jet pens are easily clogged with precipitant, particularly when a pen is stored or otherwise unused for prolonged periods of time. Such precipitation is not easily redispersed by pen shaking, as flow constriction prohibits adequate mixing within micro-channels of pen architecture. Additionally, micro-channels used for jetting can house some of the ink over prolonged periods in preparation for firing, and settled latex can cause further constricting of the micro-channels. This can result in ink-jet pen failure due to clogging of the micro-channels. The micron-order settling distances found in the fluid channels of thermal inkjet pens exacerbate the problem. Additionally, latex particles in the firing chamber of a pen are subjected to explosive thermal shear conditions. Because of this, greater inter-particulate repulsion can be greatly desired.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. It should also be noted that while the discussion may focus on dispersing agents, a latex particulate, a latex suspension, an ink-jet ink, or a method of preparing the latex particulates, such discussion in one area is applicable to the other areas.

It is noted that, as used in this specification and the appended claims, the singular forms "a," "an," and "the" include plural referents unless the context clearly dictates otherwise.

As used herein, the terms "vehicle" and "liquid vehicle" refer to the liquid fluid in which colorant or other material is carried to form an ink or fluid suspension. Liquid vehicles are well known in the art, and a wide variety of liquid vehicles may be used in accordance with embodiments of the present invention. Such ink vehicles may include a mixture of a variety of different agents, including without limitation, solvents, co-solvents, buffers, biocides, viscosity modifiers, sequestering agents, stabilizing agents, and water. The liquid vehicle can also carry other additives such as other polymers, UV curable materials, and/or plasticizers, in some embodiments. It is noted that if a colorant, e.g., dye and/or pigment, is present in liquid vehicle, the solution or dispersion (with or without the latex is considered to be an ink). In either of these embodiments, whether or not a latex is present in the ink, a latex dispersion can be used as an overcoat for the ink.

The term "colorant" can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a milled or unmodified pigment that utilizes a dispersant (which can be a polymer or an oligomer or a surfactant) in the liquid vehicle to aid the pigment in remaining dispersed therein.

As used herein, "latex particulates," and "latex particles" refer to polymeric masses synthesized from individual monomers, which can be dispersed in a liquid vehicle forming a latex dispersion, or latex. This term can also include latex encapsulated pigments where a pigment is at least partially encapsulated with a latex polymer.

As used herein, "plurality" refers to more than one. For example, a plurality of monomers refers to at least two monomers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

With these definitions in mind, it has been recognized that it would be advantageous to develop latex particulates that exhibit improved stability, both in storage and under shear conditions that occur in ink-jet architecture, and further, can continue to exhibit appropriate film-forming properties when printed on a substrate. Dispersing agents incorporated into latex particulates can be used to improve stability and retain film-forming properties of the latex. The latex particles of the present invention can be used in a variety of applications in ink-jet printing including but not limited to incorporation in overcoats, encapsulations for pigments, and the like.

In one embodiment of the present invention, a latex particulate can include a plurality of polymerized monomers and a dispersing agent. The dispersing agent including a compound having the structure of $X-CH_2(R)-SO_3M$, $X-CH_2(R)-PO_3M_2$, or mixtures thereof, wherein X is independently SH, Cl, or Br; R is independently $C_1$ to $C_{19}$ alkyl or aryl; M is independently Li, Na, or K. The dispersing agent can comprise from about 0.1 wt % to about 20 wt % of the latex particulate.

In another embodiment, a latex dispersion is provided which includes from 0.1 wt % to 50 wt % of the latex particulates of the present invention dispersed in a liquid medium. In yet a further embodiment, ink-jet ink is provided which can include from 0.1 wt % to 50 wt % of the latex particulates of the present invention. The latex particulates of the ink-jet ink are dispersed in a liquid vehicle along with a colorant.

In another embodiment, a method of forming a latex particulate can comprise dispersing a plurality of monomers and from about 0.2 wt % to about 30 wt % of a dispersing agent in an aqueous emulsion polymerizing the monomers in the presence of the dispersing agent, and forming the latex particulate such that the latex particulate includes the dispersing agent incorporated therein. The dispersing agent can have the structure $X-CH_2(R)-SO_3M$, $X-CH_2(R)-PO_3M_2$, or mixtures thereof, where X is independently SH, Cl or Br; R is independently $C_1$ to $C_{19}$ alkyl or aryl; and M is independently Li, Na, or K.

The improved stability of the latex particulates of the present invention is due, at least in part, to the incorporation of strong ionic dispersing agents into the latex particulates. Examples of strong ionic dispersing agents include but are not limited to sulfonate containing dispersing agents, phosphate containing dispersing agents, or mixtures thereof. The incorporation of these groups into the latex particulates provides for latex particulates which are very stable independent of pH due to the strong dissociation of the strong ionic groups in water. This is particularly helpful as it allows for the use of pH sensitive pigments or dyes to be used in combination with the latex particulates without compatibility problems. The dispersing agents incorporated into the polymers of the present invention have the advantage of enhancing the dispersability and stability of the latex particulates without increasing the viscosity of the aqueous media.

The dispersing agents of the present invention can be of the general formula $XCH_2-R-SO_3M$, $XCH_2(R)-PO_3M_2$, or mixtures thereof. In such formulas X can be independently selected from SH, Cl, or Br; R can be independently $C_1$ to $C_{19}$ linear or branched alkyl or linear or branched aryl; and M is independently Li, Na, or K. In one embodiment the R groups can be independently $C_1$ to $C_6$ linear or branched alkyl or linear or branched aryl. In another embodiment the R group can be independently $C_1$ to $C_2$ linear or branched alkyl or linear or branched aryl. In another embodiment the R group can be a phenyl ring. Specific non-limiting examples of dispersing agents which can be used in the present invention include but are not limited to $HSCH_2CH_2SO_3M$, $HSCH_2CH_2CH_2SO_3M$, $BrCH_2CH_2SO_3M$, $BrCH_2CH_2CH_2SO_3M$, $ClCH_2CH_2SO_3M$, $ClCH_2CH_2CH_2SO_3M$, $HSCH_2(CH_2)_2SO_3M$, $HSCH_2(CH_2)_3SO_3M$, $HSCH_2(CH_2)_4SO_3M$, $HSCH_2(CH_2)_5SO_3M$, $HSCH_2(CH_2)_{19}SO_3M$ $BrCH_2(CH_2)_2SO_3M$, $BrCH_2(CH_2)_3SO_3M$, $BrCH_2(CH_2)_4SO_3M$, $BrCH_2(CH_2)_5SO_3M$, $ClCH_2(CH_2)_2SO_3M$, $ClCH_2(CH_2)_3SO_3M$, $ClCH_2(CH_2)_{15}SO_3M$, $ClCH_2(CH_2)_5SO_3M$, $ClCH_2(CH_2)_{12}SO_3M$ $HSCH_2CH_2PO_3M_2$, $HSCH_2CH_2CH_2PO_3M_2$, $BrCH_2CH_2PO_3M_2$, $BrCH_2CH_2CH_2PO_3M_2$, and mixtures thereof. In a few specific embodiments, $HSCH_2CH_2SO_3Na$, $HSCH_2CH_2CH_2SO_3Na$, $BrCH_2CH_2SO_3Na$, and mixtures thereof can be used. Prior to polymerization, the dispersing agents can be included in aqueous monomer solutions at from 0.2% to 30% by weight compared to the monomer in the solution. In one embodiment, the dispersing agent can be present in the monomer solution at from 1% to 20% by weight compared to the monomer. In another embodiment, the dispersing agent can be present at from 5% to 10% by weight compared to the monomer.

After polymerization, the dispersing agent can be incorporated into the latex particulates such that at least about 40% by weight of the provided dispersing agent is incorporated into the latex particles. In one embodiment, at least about 50% of the latex particulate is incorporated into the latex particulate. In another embodiment, the dispersing agent can comprise about 0.1% to 20% by weight of the latex particulate. In yet another embodiment, the dispersing agent can comprise from 1% to 15% by weight of the latex particulate. In a further embodiment, the dispersing agent can comprise from 2% to 7 wt % of the latex particulate.

It is noteworthy that the dispersing agents used in the present invention are non-polymerizable and are not polymerized into the latex, but rather, are incorporated into the latex through attachment, forming pendant groups. Because of the non-polymerizable nature of the dispersing agents, excess or residual un-reacted dispersing agents present in the aqueous phase do not increase the viscosity and, when ink-jetted, do not interfere with the printability. In some cases, the un-reacted dispersing agents can act as surfactants because of the presence of hydrophobic and hydrophilic moieties. This is particularly advantageous when used with pigment dispersions that can require large quantities of surfactant.

The monomers used to form a latex particulate can be any monomer presently known in the art, and can be either hydrophobic or hydrophilic in nature. In one embodiment, the monomer can comprise or consist essentially of an acrylate, a methacrylate, or other vinyl containing monomers such as styrene. Non-limiting examples of monomers include methyl acrylate, ethyl methacrylate, ethyl acrylate, butyl methacrylate, butyl acrylate, hexyl methacrylate, 2-ethylhexyl methacrylate, 2-ethylhexyl acrylate, isobutyl methacrylate, isobutyl acrylate, octyl methacrylate, lauryl methacrylate, dodecyl methacrylate, styrene, and mixtures thereof. Additionally, the incorporation of up to 10% of acidic groups, e.g. methacrylic acid, to the latex particulate can provide anionic stabilization to the latex particulates.

Depending on the anticipated application, it can be useful to have latex particulates of a particular size. In one embodiment, as applicable to any of the herein disclosed dispersing agents, the latex particulate can have a particle size of about 100 nm to about 300 nm. Such size can be particularly useful in using the latex particulates in a thermal ink-jet ink.

The latex particulates of the present invention can be used in a variety of applications. In one aspect, the latex particulates can be dispersed in a liquid medium, thus forming a latex or latex dispersion. In a further embodiment, the latex can include 0.1 wt % to 50 wt % of the latex particulates dispersed in a liquid medium. Further, the latex can be an ink-jet ink. An ink-jet ink can include 0.1 wt % to 50 wt % of the latex particulates dispersed in a liquid vehicle and colorant. In one aspect of the present invention, when used in an ink-jet ink, the latex particulate and the colorant can be present at a ratio of 1:2 to 2:1 by weight.

As previously mentioned, colorant can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer or surfactant dispersed pigments. The colorant can comprise or consist essentially of dye. Additionally, the colorant can comprise or consist essentially of pigment.

Polymerization of the monomers can be initiated, thus forming the latex particulates that include dispersing agent. The general polymerization of the monomers to latex particulates can be done by emulsion polymerization. As such, polymerization parameters, such as selection of monomers, polymerization time, emulsion temperature and conditions, etc, can be selected based on desired latex particulates and/or anticipated uses. It is noted that the dispersing agent can be dispersed with the monomers prior to initiation of monomer polymerization, or the dispersing agent can be dispersed with the monomers after polymerization has begun, thus generating latex particulates that have the dispersing agent concentrated more at the surface of the latex particulates.

In one embodiment, one or a plurality of solid particles can be included in the emulsion during polymerization of the monomers, with any of the disclosed dispersing agents. The solid particles can be at least partially encapsulated during polymerization. In one aspect, the solid particles can be substantially encapsulated by the latex particulates during polymerization. Pigments can be used as the solid particles. By encapsulating pigment particles during polymerization that includes the dispersing agents of the present application, the pigment particles can demonstrate better stability and dispersion than without encapsulation, particularly when configured for use in a thermal ink-jet ink.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

Classes of co-solvents that can be used separately or in combination include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and mixtures thereof.

The liquid vehicle can also comprise solution characteristic modifiers such as viscosity modifiers, pH adjusters, preservatives, various types of surfactant, antioxidants, and evaporation accelerators. Examples of surfactants that can be included in limited amounts, according to the present invention, include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyidimethylbetaine, and lauryldihydroxyethylbetaine; and mixtures thereof. Fluorosurfactants can also be used such as those previously known in the art.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyidiethanolamine, di-n-butylethanolamine, monoisopropanolamine, diisopropanolamine, and triisopropanolamine, and the like as well as mixtures thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, NUOSEPT (Nudex, microbicide/microbistat including 1H,3H,5H-Oxaxolo[3,4-

C]Oxazole-7A(7H)-Methanol), UCARCIDE (Dow Chemical Co., e.g., broad spectrum biocide including glutaraldehyde), VANCIDE (R.T. Vanderbilt Co., e.g., fungicide including zinc dimethyldithiocarbamate), PROXEL (ICI America, e.g., BIT only and BIT blend formulations), and mixtures thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, other latex particulates, UV curable materials, plasticizers, pigments (other than the colorant), etc.

Latex particulates produced using the dispersing agents as presently disclosed exhibit improved stability, printability, and print performance, particularly when used in thermal ink-jet imaging. Such dispersing agents can be used in regular emulsion polymerization processes, and thus require little modification to process design. Additionally, the dispersing agents do not increase the viscosity of the aqueous phase and can act favorably as surfactants, particularly when used in pigment containing ink-jet inks. It is noteworthy that the stability of the latex particulates of the present invention can be further improved by the addition of free-radically polymerizable acids such as acrylic acid or methacrylic acid. Additionally, the latex particulates of the present invention can optionally be cross-linked to an extent of about 1%. Generally, any cross-linking agents known in the art can be used so long as they do not negatively interfere with or prevent the incorporation of the dispersing agents in the latex particulates.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Dispersing Agent-Containing Latex

The monomers methyl methacrylate (40 g) and hexyl methacrylate (40 g) are emulsified in water (34 ml) containing 30% Rhodafac RS 710 (8.32 g) and $HSCH_2CH_2SO_3Na$ (4 g). Initiator solution is prepared by dissolving potassium persulfate (0.348 g) in water (40 ml). The initiator solution is added to the monomer solution at a rate such that it can last for a period of about 23 minutes. Three minutes after the addition of the initiator solution, the emulsion addition was started over a period of about 20 minutes. The reaction mixture was maintained at a temperature of about 90° C. for a period of about 2 hours and then cooled. The pH of the formed latex particulate containing solution was then adjusted to 8.5 and filtered to obtain the latex containing the dispersing agent.

Example 2

Preparation of Dispersing Agent-Containing Latex

The monomers methyl methacrylate (40 g) and hexyl methacrylate (40 g) are emulsified in water (34 ml) containing 30% Rhodafac RS 710 (8.32 g) and $BrCH_2CH_2SO_3Na$ (4 g). Initiator solution is prepared by dissolving potassium persulfate (0.348 g) in water (40 ml). The initiator solution is added to the monomer solution at a rate such that it can last for a period of about 23 minutes. Three minutes after the addition of the initiator solution, the emulsion addition was started over a period of about 20 minutes. The reaction mixture was maintained at a temperature of about 90° C. for a period of about 2 hours and then cooled. The pH of the formed latex particulate containing solution was then adjusted to 8.5 and filtered to obtain the latex containing the dispersing agent.

Example 3

Preparation of Dispersing Agent-Containing Latex

Example 1 or Example 2 is repeated, except that the dispersing agent is added after monomer polymerization has already begun. This generates latex particulates with dispersing agent incorporated at the surface of the latex particulates, but not within its most inner core.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

The invention claimed is:

1. A latex particulate, comprising:
   a plurality of polymerized monomers; and
   a dispersing agent which becomes incorporated into the latex particulate, and which includes the structure:
   $X—CH_2(R)—SO_3M$, $X—CH_2(R)—PO_3M_2$, or mixtures thereof,
   wherein X is independently SH, Cl or Br; R is independently $C_1$ to $C_{19}$ linear or branched alkyl or linear or branched aryl; M is independently Li, Na, or K; and wherein the dispersing agent comprises from about 0.1 wt % to about 20 wt % of the latex particulate.

2. The latex particulate of claim 1, wherein the dispersing agent is a sulfonate containing dispersing agent.

3. The latex particulate of claim 1, wherein the dispersing agent is a phosphate containing dispersing agent.

4. The latex particulate of claim 1, wherein the dispersing agent comprises from 1 wt % to 15 wt % of the latex particulate.

5. The latex particulate of claim 1, wherein the dispersing agent comprises about 2 wt % to about 7 wt % of the latex particulate.

6. The latex particulate of claim 1, wherein the dispersing agent includes the structure $HSCH_2CH_2SO_3M$, $HSCH_2CH_2CH_2SO_3M$, $BrCH_2CH_2SO_3M$, $BrCH_2CH_2CH_2SO_3M$, $ClCH_2CH_2SO_3M$, $ClCH_2CH_2CH_2SO_3M$, $HSCH_2(CH_2)_2SO_3M$, $HSCH_2(CH_2)_3SO_3M$, $HSCH_2(CH_2)_4SO_3M$, $HSCH_2(CH_2)_5SO_3M$, $BrCH_2(CH_2)_2SO_3M$, $BrCH_2(CH_2)_3SO_3M$, $BrCH_2(CH_2)_4SO_3M$, $BrCH_2(CH_2)_5SO_3M$, $ClCH_2(CH_2)_2SO_3M$, $ClCH_2(CH_2)_3SO_3M$, $ClCH_2(CH_2)_4SO_3M$, $ClCH_2(CH_2)_5SO_3M$ $HSCH_2CH_2PO_3M_2$, $HSCH_2CH_2CH_2PO_3M_2$, $BrCH_2CH_2PO_3M_2$, $BrCH_2CH_2CH_2PO_3M_2$, or mixtures thereof.

7. A latex particulate of claim 1, wherein the latex particulate has a particle size of about 100 nm to about 300 nm.

8. A latex dispersion, comprising 0.1 wt % to 50 wt % of the latex particulates of claim 1 dispersed in a liquid medium.

9. An ink-jet ink, comprising 0.1 wt % to 50 wt % of the latex particulates of claim 1 dispersed in a liquid vehicle, and colorant.

10. The ink-jet of claim 9, wherein the latex particulates and the colorant are present in the ink-jet ink at ratio of 1:2 to 2:1 by weight.

11. A method of forming a latex particulate, comprising:
a) dispersing a plurality of monomers and from about 0.2 wt % to about 30 wt % of a dispersing agent in an aqueous emulsion, said dispersing agent having the structure:
X—CH$_2$(R)—SO$_3$M, X—CH$_2$(R)—PO$_3$M$_2$, or mixtures thereof,
wherein X is independently SH, Cl or Br; R is independently C$_1$ to C$_{19}$ linear or branched alkyl or linear or branched aryl; and M is independently Li, Na, or K;
b) polymerizing the monomers in the presence of the dispersing agent; and
c) forming the latex particulate such that the latex particulate includes the dispersing agent incorporated therein.

12. The method of claim 11, wherein the dispersing agent is incorporated throughout the latex particulate.

13. The method of claim 11, wherein the dispersing agent is incorporated on an outer surface of the latex particulate, but is not incorporated at a location within the latex particulate.

14. The method of claim 11, wherein the dispersing agent includes the structure HSCH$_2$CH$_2$SO$_3$M, HSCH$_2$CH$_2$CH$_2$SO$_3$M, BrCH$_2$CH$_2$SO$_3$M, BrCH$_2$CH$_2$CH$_2$SO$_3$M, ClCH$_2$CH$_2$SO$_3$M, ClCH$_2$CH$_2$CH$_2$SO$_3$M, HSCH$_2$(CH$_2$)$_2$SO$_3$M, HSCH$_2$(CH$_2$)$_3$SO$_3$M, HSCH$_2$(CH$_2$)$_4$SO$_3$M, HSCH$_2$(CH$_2$)$_5$SO$_3$M, BrCH$_2$(CH$_2$)$_2$SO$_3$M, BrCH$_2$(CH$_2$)$_3$SO$_3$M, BrCH$_2$(CH$_2$)$_4$SO$_3$M, BrCH$_2$(CH$_2$)$_5$SO$_3$M, ClCH$_2$(CH$_2$)$_2$SO$_3$M, ClCH$_2$(CH$_2$)$_3$SO$_3$M, ClCH$_2$(CH$_2$)$_4$SO$_3$M, ClCH$_2$(CH$_2$)$_5$SO$_3$M, HSCH$_2$CH$_2$PO$_3$M$_2$, HSCH$_2$CH$_2$CH$_2$PO$_3$M$_2$, BrCH$_2$CH$_2$PO$_3$M$_2$, BrCH$_2$CH$_2$CH$_2$PO$_3$M$_2$, or mixtures thereof.

15. The method of claim 11, wherein the dispersing agent is provided from about 1 wt % to about 20 wt %.

16. The method of claim 11, wherein the dispersing agent comprises about 0.1 wt % to about 20 wt % of the latex particulate.

17. The method of claim 11, wherein the dispersing agent comprises about 2 wt % to about 7 wt % of the latex particulate.

18. The method of claim 11, wherein the dispersing agent is a sulfonate containing dispersing agent.

19. The method of claim 11, wherein the dispersing agent is a phosphate containing dispersing agent.

20. The method of claim 11, wherein at least about 40 wt % of the dispersing agent that is used in the method is incorporated into the latex particulate.

* * * * *

UNITED STATES PATENT AND TRADEMARK OFFICE
CERTIFICATE OF CORRECTION

PATENT NO. : 8,252,854 B2  
APPLICATION NO. : 11/825214  
DATED : August 28, 2012  
INVENTOR(S) : Slvapackia Ganapathiappan Page 1 of 1

It is certified that error appears in the above-identified patent and that said Letters Patent is hereby corrected as shown below:

In the Specifications:

In column 6, line 66, after "(Nudex," insert -- Inc. e.g., --.

In the Claims:

In column 8, line 60, in Claim 6, delete "$ClCH_2(CH_2)_5SO_3M$" and insert -- $ClCH_2(CH_2)_5SO_3M$, --, therefor.

In column 8, line 64, in Claim 7, delete "A" and insert -- The --, therefor.

In column 9, line 4, in Claim 10, delete "ink-jet" and insert -- ink-jet ink --, therefor.

Signed and Sealed this  
Tenth Day of September, 2013

Teresa Stanek Rea  
*Acting Director of the United States Patent and Trademark Office*